Dec. 7, 1971    R. E. N. KLOHR    3,624,942
SLIDE DISPLAY STRUCTURE
Filed July 18, 1969    2 Sheets-Sheet 1

INVENTOR
Robert E. N. Klohr
BY Jerome M. Teplitz
ATTORNEY

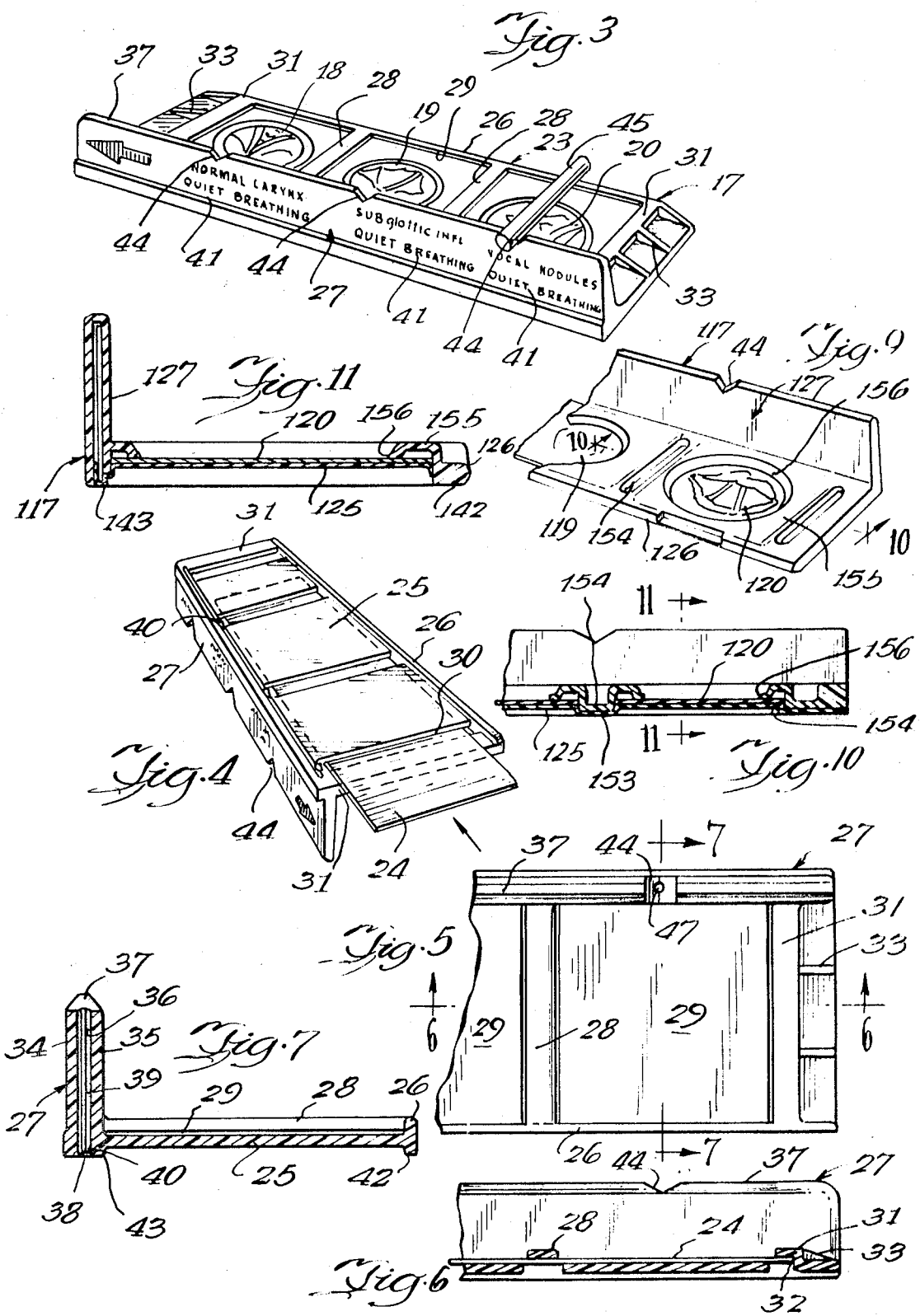

United States Patent Office 3,624,942
Patented Dec. 7, 1971

3,624,942
SLIDE DISPLAY STRUCTURE
Robert E. N. Klohr, Fenton, Mo., assignor to
Sherwood Medical Industries Inc.
Filed July 18, 1969, Ser. No. 842,969
Int. Cl. G09f 11/30
U.S. Cl. 40—64 A                       6 Claims

ABSTRACT OF THE DISCLOSURE

A slide display structure for holding viewing elements such as transparencies or pictures at a display position. The slide display structure includes a carrier portion adapted to hold a plurality of such viewing elements and is provided at one edge thereof with an upstanding information providing means which is further adapted for cooperation with associated apparatus for indexing the slide display structure. The information providing means may serve as a manipulating portion of the slide display structure. The slide display structures are adapted to be stored in a suitable drawer, or the like, with the information means viewable to facilitate selection of desired display structures.

BACKGROUND OF THE INVENTION

Field of the invention

This invention relates to display structures and in particular to slide display structures.

Description of the prior art

In the conventional slide display structures, a mount is provided for holding a transparency, or the like. Identification of the particular transparency is conventionally effected by printing directly on the slide mount. In manipulating such conventional slides, the user grasps the edges of the slide to insert and remove the slide relative to a display apparatus. Such manipulation of the slide is undesirable in that quite often fingerprints are inadvertently left on the slide and such manipulation requires dexterity in preventing inadvertent dropping of the slide.

Another problem resulting from such a method of marking the slide is the difficulty of locating a desired slide in a group thereof which are normally stacked in a suitable container. Elaborate devices have been developed for identifying portions of the container so as to locate the slides inserted therein.

In one improved form of such a display apparatus, a manikin is provided for displaying different representations of the human larynx. In this structure, individual slide holders are provided, each of which has a different representation of a different stage of the disease of the larynx. To utilize such a plurality of individual slide holders, a stack loading or magazine system is required.

One alternate form of such a display device may utilize a strip film. Here, again, identification of the individual pictures is difficult and requires an indexing system. Further, such strip film systems have the disadvantage of relative fragility.

SUMMARY OF THE INVENTION

The present invention comprehends an improved slide display structure adapted for use in displaying pictures, transparencies, and the like, with ready direct identification of the individual displays. The slide display structures are adapted for facilitated storage and facilitated identification while in the storage facilities. Further, the slide display structure of the present invention provides a secure mounting of the display means while yet permitting facilitated installation or removal thereof from the structure. Further, the slide display structure of the present invention comprehends improved means for providing facilitated identification means installation.

The slide display structure provides improved rigid support of the display elements while yet being formed of relatively inexpensive material such as plastic. Thus, the slide display structure is extremely simple and economical of construction.

BRIEF DESCRIPTION OF THE DRAWINGS

Other features and advantages of the invention will be apparent from the following description taken in connection with the accompanying drawings wherein:

FIG. 3 is a perspective view of a slide display structure embodying the invention in association with the positioning means of the display apparatus;

FIG. 4 is a perspective view of the slide display structure in an inverted position illustrating the insertion of the display element thereinto;

FIG. 5 is a fragmentary top plan view of the slide display structure;

FIG. 6 is a fragmentary transverse section taken substantially along the line 6—6 of FIG. 5;

FIG. 7 is a vertical section taken substantially along the line 7—7 of FIG. 5;

FIG. 9 is a fragmentary perspective view of a modified form of slide display structure embodying the invention;

FIG. 10 is a transverse section taken substantially along the line 10—10 of FIG. 9; and FIG. 11 is a fragmentary enlarged vertical section thereof taken substantially along the line 11—11 of FIG. 10.

DESCRIPTION OF THE PREFERRED EMBODIMENTS

Figure 1:
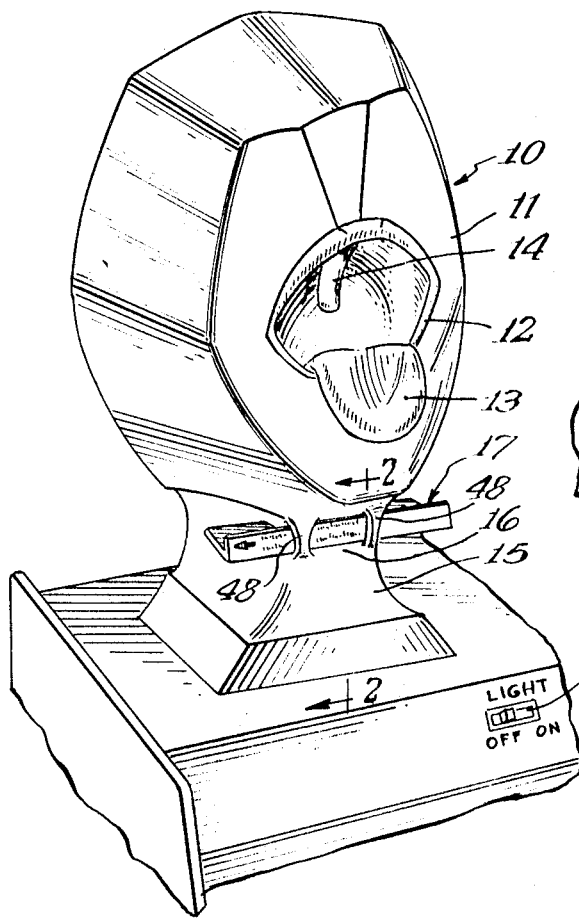
FIG. 1 is a front elevation of a display device having a slide structure embodying the invention.

In the exemplary embodiment of the invention as disclosed in FIGS. 1-8 of the drawing, a display device generally designated 10 is shown to comprise a laryngoscopic manikin, it being understood that the display device may be in any suitable form including slide projector, slide viewing, picture projector, picture viewing, etc., forms. In the illustrated manikin, an upper portion 11 defines a life-size head-neck representation including a mouth portion 12 provided with a simulated tongue 13 and soft palate 14. A neck portion 15 is provided at the level of the rima glottidis with a slide mount 16. The slide mount is adapted to removably receive any one of a plurality of slide display holders 17 for selectively displaying through the mouth 12 representations of the human larynx. In the illustrated embodiment, the slide holders are provided with three display elements 18, 19 and 20, as shown in FIG. 3, which may be selectively disposed in the viewing space 21 (FIG. 2) for observation through the open mouth 12. Thus, the laryngoscopic manikin 10 permits the study of different larynx conditions as by medical students, etc., in a manner simulating the study thereof in a live patient. The manikin may be provided with a suitable light source (not shown) controlled by conventional switch 22 to provide subglottal illumination as where the display elements are transparencies, or may be illuminated by the conventional outside light and head mirror means (not shown) utilized by doctors where the slide display elements comprise opaque pictures.

The present invention is concerned with the provision of an improved slide display holder for use in such a display device 10. More specifically, as seen in FIGS. 3–7, the slide display holder 17 comprises a carrier generally designated 23 having means for supporting the viewing elements 18, 19 and 20 which may be provided in the form of pictures on a strip 24. The carrier includes a flat base 25, a short upstanding rear wall 26, and a tall upstanding front wall 27.

Spaced in overlying relationship to the base 25 is a pair of bar retainers 28 which, with the base 25, cooperatively define a space 29 for receiving the strip 24. As shown in FIG. 4, base 25 is provided with an entrance slot 30 through which the strip 24 may be inserted into space 29. The opposite ends of the base are provided with upstanding inturned end walls 31 defining shoulders 32 against which the opposite ends of the strip 24 may abut to accurately position the strip in the carrier so as to dispose the respective pictures 18, 19 and 20 in a preselected disposition in the carrier 23. As best seen in FIG. 3, the end walls 31 may be provided with reinforcing ribs 33 for providing improved rigidity to the carrier and for providing improved guidance of the carrier when inserting the carrier into the display device.

Front wall 27 comprises a hollow double walled portion of the slide display holder 17 which, as best seen in FIG. 7, includes a front panel 34 and a rear panel 35 defining therebetween a card receiving space 36. The top edges of the panels 34 and 35 may be joined by a transverse wall portion 37 whereby the space 36 comprises a downwardly opening space having a lower opening 38 through which information providing means in the form of a suitable card 39 may be inserted. The rear panel 35 may be provided with suitable lugs 40 for effectively retaining the card in the space 36 while permitting free insertion of the card thereinto. The card 39 may be provided with different information indicia 41 as desired corresponding to the respective display elements 18, 19 and 20 so that a direct correlation is readily obtained between the information and the rearwardly lying display element. Illustratively, display element 18 may comprise a picture of a normal larynx providing quiet breathing, display element 19 may comprise a picture of a larynx having a subglottic inflammation during quiet breathing, and display element 20 may show vocal nodules during quiet breathing. Suitable respective identifications may be provided in indicia 41 corresponding to such respective display elements.

As shown in FIG. 7, the rear wall 26 includes a depending portion 42 and front wall 27 includes a depending portion 43. Said portions 42 and 43 space the base 25 above the plane of the bottom of portions 42 and 43 and thereby effectively preclude scratching of the lower surface of base 25 which is undesirable where the display elements comprise transparencies requiring that the illumination be transmitted therethrough. Display holder 17 may be formed of a suitable strong preferably transparent plastic, such as clear styrene and, thus, the display holder may be formed as a one-piece molded structure providing substantial simplicity and economy of construction.

Figure 2:
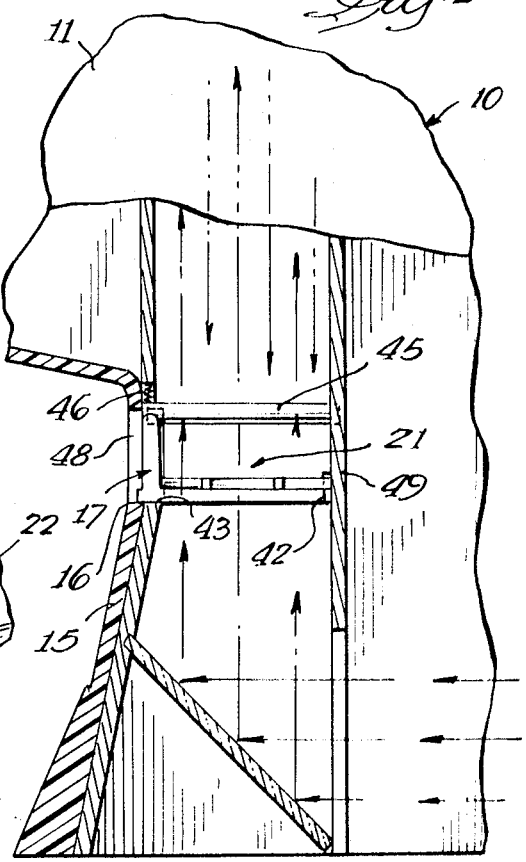
FIG. 2 is a fragmentary enlarged vertical section taken substantially along the line 2—2 of FIG. 1.

As best seen in FIG. 3, the upper wall 37 of the front wall 27 is provided with a plurality of notches 44 adapted to be engaged by a retaining pin 45 carried by the display device 10 overlying viewing space 21. Thus, as shown in FIGS. 1 and 2, the display holder 17 may be inserted endwise into the slide mount 16 to position each of display elements 18, 19 and 20 selectively at space 21 with the pin 45 indexing the display holder for accurately positioning of each of the three display elements thereat. If desired, a biasing spring 46 may be provided for releasably engaging the pin 45 with the respective notches 44. As shown in FIG. 5, notches 44 may extend fully downwardly through the top wall 27 so as to define a small opening 47 to space 36. The depending wall portions 42 and 43 serve as rails in guiding the display holder 17 on the slide mount 16 in positioning the display holder 17. Further, as shown in FIG. 1, a pair of retainer elements 48 may be provided on the display device 10 to define the front of the space 21 and cooperate with a rear wall 49 in guiding the display holder 17 longitudinally through the space 21.

Thus, the display holder 17 provides an improved slide display structure wherein a plurality of display elements are provided in a single holder with associated identification information readily available to the user at the front of space 21 between the retaining elements 48. Thus, the user may inspect the representation disposed at space 21 by viewing the same through the mouth opening 12 in the normal manner of viewing the larynx of a human patient. To provide greatest similarity to actual patient viewing conditions, the user may illuminate the display elements by conventional outside light and head mirror means. Alternatively, to facilitate viewing of the display element, the display element may comprise a transparency viewable by means of suitably transmitted light therethrough permitting the elimination of the outside light and head mirror.

Figure 8:
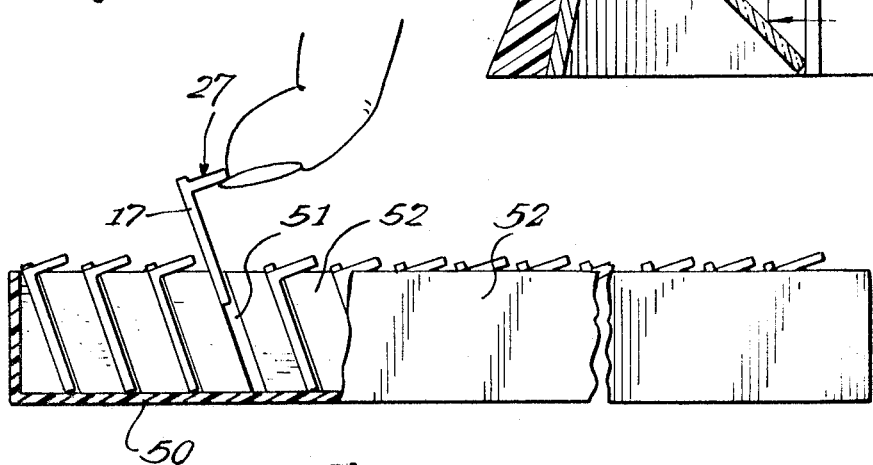
FIG. 8 is a side elevation of a container housing a plurality of slide display structures embodying the invention, with portions broken away to facilitate the illustration thereof.

The display holder 17 is adapted for facilitated storage and retrieval. Thus, as shown in FIG. 8, a plurality of such display holders 17 may be provided in a suitable container 50, such as a drawer, having suitable slots 51 in the side walls 52 thereof whereby the front walls 27 are disposed for ready viewing of the information means 41 carried thereby. The respective display holders 17 may be readily inserted and removed from the container by fingertip manipulation. As shown, the slots 51 may be slightly canted forwardly so as to present the information means 41 at an optimum angle.

The front wall 27 provides an improved grasping means for facilitating handling of the display holder 17. The front wall further serves as means for reinforcing the base portion 25 against deformation in the direction of the front wall and the pair of bar retainers 28 serve to reinforce the carrier 23 against deformation parallel thereto. Thus, the display holder 17 may be made relatively light and at extremely low cost while yet providing the highly desirable advantages discussed above.

Referring now to FIGS. 9–11, a modified form of display holder generally designated 117 is shown to comprise a display holder generally similar to display holder 17 but having a modified structure for holding individual display elements such as display elements 119 and 120, as seen in FIG. 9. In this form, the display elements comprise individual slides which may comprise transparent slides or opaque picture slides as desired. The base 125 may be provided with a plurality of channels 153 adapted to receive a depending rib structure 154 of an overlying top plate 155. The top plate is provided with a plurality of suitable openings 156 through which the display elements may be scanned. The display elements 119 and 120 are effectively retained in centered association relative to the openings 156 by engagement thereof with the ribs 154 at their lateral edges and the rear wall 126 and front wall 127 at their rear and front edges respectively. As in holder 17, the rear wall 126 may be provided with a depending wall portion 142 and the front wall 127 may be provided with a depending wall portion 143 to space the base 125 above the plane of the bottom wall portions 142 and 143 and thereby minimize scratching of the plastic defining base 125.

Holder 117, thusly, is similar to and functions in a manner similar to holder 17. Base 125 may be formed integrally with the remainder of holder 117 or may comprise a separate element secured to the remainder of the holder as desired. Where the base is formed integrally, it may have a movable association with the base to permit facilitated insertion of the display elements.

Portions of holder 117 corresponding to similar portions of holder 17 are identified by similar reference numerals but 100 higher.

As will be obvious to those skilled in the art, the holder may be adapted for carrying any suitable number of display elements with coordinated information display. The holder is adapted for use with different types of display apparatus and may be utilized without indexing means, although as discussed above, indexing of the holder provides for facilitated use of the plurality of different display elements. As discussed above, the slide display structure provides an improved teaching-training and demonstrating means, such as in the training of doctors.

The foregoing disclosure of specific embodiments is illustrative of the broad inventive concepts comprehended by the invention.

I claim:

1. A slide display holder comprising: means for holding in coplanar side-by-side relationship a plurality of viewing elements; and means extending transversely to the plane of said holding means arranged to carry information relating individually to said viewing elements; said information carrying means comprising means defining an internal space for receiving information means and having a front portion through which said information means may be viewed.

2. The slide display holder of claim 1 wherein said front portion comprises a transparent wall element.

3. A slide display holder comprising: means for holding in coplanar side-by-side relationship a plurality of viewing elements; means extending transversely to the plane of said holding means arranged to carry information relating individually to said viewing elements; said holding means is provided wth a bottom transparent wall, and depending peripheral means for spacing the bottom wall above the bottom plane of said peripheral means thereby to space said bottom wall above a flat surface on which the holder may be placed.

4. Slide holder structure comprising:
a plurality of slide holders each having a first portion having a substantial lateral extent defining means for holding a display element, and a second portion turned from said first portion to extend transversely to said lateral extent of the first portion;
rearwardly receivable information means on said second portion; and
means for removably storing said plurality of slide holders with said information means in receivable juxtaposition.

5. The slide holder structure of claim 4 wherein each of said slide holder first portions is arranged to hold a plurality of display elements in side-by-side relationship and said turned portion carries a plurality of said information means corresponding one each with said display elements.

6. The slide holder structure of claim 4 wherein said turned portion defines a grasping portion for manipulation of said slide holder structure to and from said storing means.

References Cited

UNITED STATES PATENTS

| | | | |
|---|---|---|---|
| 1,943,673 | 1/1934 | Hudson | 40—64 A |
| 2,349,013 | 5/1944 | Sparling | 40—63 X A |
| 2,583,510 | 1/1952 | Ingram | 40—64 A |
| 2,643,577 | 6/1953 | Williams | 40—64 X A |
| 2,779,115 | 1/1957 | Durham et al. | 40—17 |
| 3,142,918 | 3/1964 | Offensend et al. | 40—106.1 X |
| 3,471,944 | 10/1969 | Breckwoldt | 35—17 |

FOREIGN PATENTS 15,563  11/1955  Germany.

ROBERT W. MICHELL, Primary Examiner

R. CARTER, Assistant Examiner

U.S. Cl. X.R.

—106.1, 158; 35—17